(12) United States Patent
Ikeuchi et al.

(10) Patent No.: US 10,404,887 B2
(45) Date of Patent: Sep. 3, 2019

(54) READOUT CONTROLLING DEVICE AND IMAGE FORMING APPARATUS

(71) Applicant: KYOCERA Document Solutions Inc., Osaka-shi, Osaka (JP)

(72) Inventors: Atsuya Ikeuchi, Osaka (JP); Tomohiro Takahashi, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/220,992

(22) Filed: Dec. 14, 2018

(65) Prior Publication Data
US 2019/0191052 A1    Jun. 20, 2019

(30) Foreign Application Priority Data

Dec. 15, 2017  (JP) ................. 2017-240381

(51) Int. Cl.
| | |
|---|---|
| *G03G 15/00* | (2006.01) |
| *H04N 1/32* | (2006.01) |
| *G03G 15/08* | (2006.01) |
| *G06F 3/12* | (2006.01) |
| *H04N 1/23* | (2006.01) |

(52) U.S. Cl.
CPC ..... *H04N 1/32625* (2013.01); *G03G 15/0863* (2013.01); *G06F 3/1234* (2013.01); *H04N 1/2392* (2013.01); *H04N 1/32694* (2013.01)

(58) Field of Classification Search
CPC ............ G03G 15/0863; G03G 15/5087; G06F 3/1234; H04N 1/32625; H04N 1/2392; H04N 1/32694; H04N 1/3263; H04N 1/32657; H04N 1/32138
See application file for complete search history.

(56) References Cited

U.S. PATENT DOCUMENTS

| | | | |
|---|---|---|---|
| 10,321,012 B2* | 6/2019 | Eiiliott | G03G 15/5029 |
| 2008/0151313 A1* | 6/2008 | Ishimaru | H04N 1/00342 358/400 |
| 2009/0184817 A1* | 7/2009 | Ishizuka | B41J 3/50 340/539.1 |

FOREIGN PATENT DOCUMENTS

JP        2011059240 A       3/2011

* cited by examiner

*Primary Examiner* — Hoang X Ngo
(74) *Attorney, Agent, or Firm* — Alleman Hall Creasman & Tuttle LLP

(57) ABSTRACT

A readout controlling device includes a start time recording portion, a transmission controlling portion, an error determining portion, and a time changing portion. A start time of when a piece of information is read out from a storage device connected to the readout controlling device is recorded in the start time recording portion. The transmission controlling portion transmits a readout request to read out the piece of information, toward the storage device based on the start time. The error determining portion receives the piece of information readout from the storage device, and determines whether or not an error has occurred in the piece of information. If the error has been determined to have occurred, the time changing portion can change the start time recorded in the start time recording portion.

8 Claims, 7 Drawing Sheets

FIG.3

NONVOLATILE MEMORY (14)

START TIME RECORDING PORTION (14A)

RT1: START TIME

OCCURRENCE COUNT RECORDING PORTION (14B)

| START TIME RT1 | OCCURRENCE COUNT EN1 |
|---|---|
| MINIMUM VALUE | 0 |
| ⋮ | ⋮ |
| MAXIMUM VALUE | 0 |

OCCURRENCE TIME RECORDING PORTION (14C)

| OCCURRENCE COUNT EN1 | OCCURRENCE TIME ET1 |
|---|---|
| 1 | t1(ms) |
| ⋮ | ⋮ |
| 5 | t5(ms) |

TRANSMISSION COUNT RECORDING PORTION (14D)

| START TIME RT1 | TRANSMISSION COUNT TN1 |
|---|---|
| MINIMUM VALUE | 0 |
| ⋮ | ⋮ |
| MAXIMUM VALUE | 0 |

READOUT CONTROLLING DEVICE AND IMAGE FORMING APPARATUS

INCORPORATION BY REFERENCE

This application is based upon and claims the benefit of priority from the corresponding Japanese Patent Application No. 2017-240381 filed on Dec. 15, 2017, the entire contents of which are incorporated herein by reference.

BACKGROUND

The present disclosure relates to a readout controlling device configured to read out information from a storage device, and an image forming apparatus configured to form an image on a sheet.

Generally, a variety of consumable units are removably provided in an image forming apparatus. An example of the consumable unit is a toner container used in an electrophotographic image forming apparatus. In the electrophotographic image forming apparatus, an image is formed on a sheet using toner supplied from the toner container.

In the image forming apparatus, the consumable unit may be managed using RFID (Radio Count Identification) technology. Specifically, an RFID tag that is a storage device including a storage medium on its inside where information can be read from and written to, is provided on the toner container. The information includes identification information relating to the toner container. The information in the storage device is generally read out by a readout controlling device of a control device or the like in the image forming apparatus. Specifically, at a predetermined readout timing, the readout controlling device transmits a readout request to the RFID tag via a reader portion. The readout controlling device receives a piece of information read out from the RFID tag via the reader portion, and determines whether or not the toner container is a genuine product based on the piece of information.

Generally, a data transmission path is provided between the reader portion and the readout controlling device. If noise is superposed on the data transmission path, an error can occur in the piece of information. Accordingly, the readout controlling device is configured to determine whether or not the error has occurred in the piece of information. If the readout controlling device determines that the error has occurred, the readout controlling device transmits a retransmission request to the RFID tag, and receives the piece of information again.

SUMMARY

A readout controlling device according to an aspect of the present disclosure includes a start time recording portion, a transmission controlling portion, an error determining portion, and a time changing portion. A start time of when a piece of information is read out from a storage device connected to the readout controlling device is recorded in the start time recording portion. The transmission controlling portion transmits a readout request to read out the piece of information, toward the storage device based on the start time. The error determining portion receives the piece of information read out from the storage device, and determines whether or not an error has occurred in the piece of information. If the error has been determined to have occurred, the time changing portion can change the start time recorded in the start time recording portion.

An image forming apparatus according to another aspect of the present disclosure includes an image forming portion, a toner container, and the readout controlling device. The image forming portion includes a developing device for developing an electrostatic latent image on an image carrier using toner. The toner container stores toner supplied to the developing device. The storage device is provided in or on the toner container. The piece of information relates to the toner container.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a schematic diagram showing data recorded in a nonvolatile memory shown in FIG. 2.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

Figure 1:
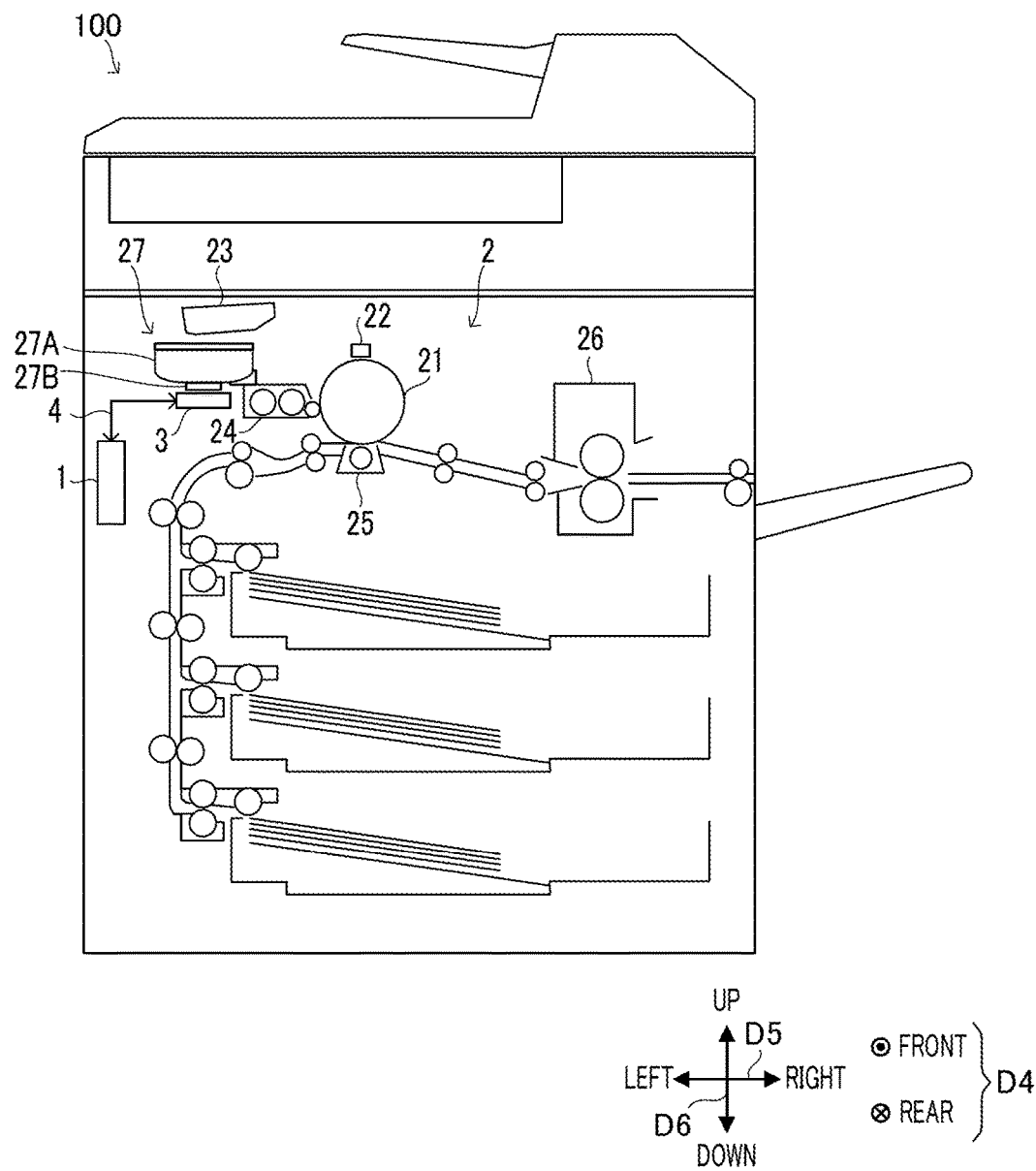
FIG. 1 is a schematic diagram showing a configuration of an image forming apparatus according to an embodiment of the present disclosure.

As shown in FIG. 1, an image forming apparatus 100 is a copying machine, a printer, a facsimile, a multifunction peripheral, or the like. The multifunction peripheral includes a copying function, a printing function, a facsimile function, or the like. The image forming apparatus 100 includes a control circuit substrate 1, an image forming portion 2, and a reader/writer portion 3.

Figure 2:
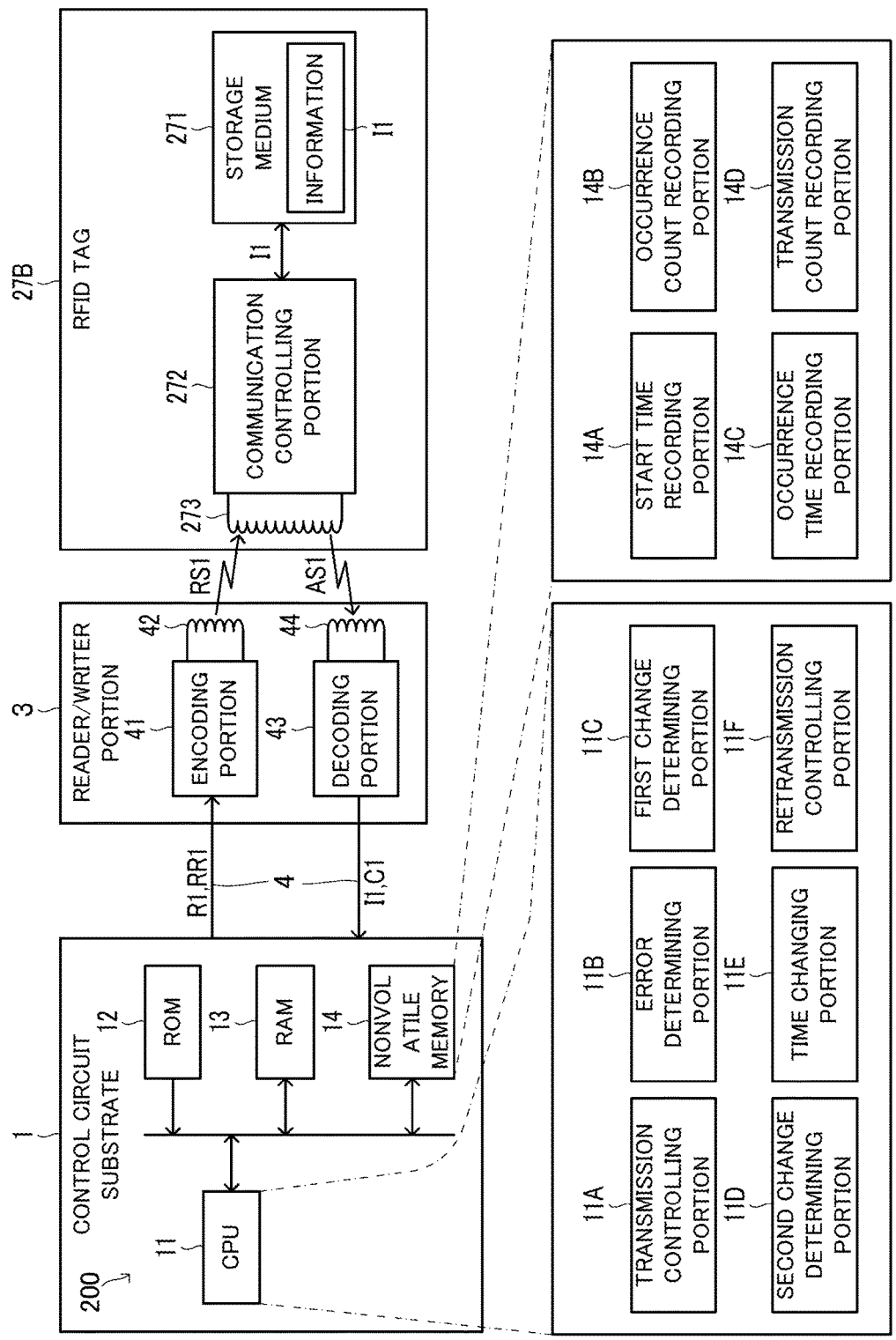
FIG. 2 is a block diagram showing a configuration of a readout controlling device provided in the image forming apparatus shown in FIG. 1.

The control circuit substrate 1 is an example of a control device in the present disclosure. As shown in FIG. 2, the control circuit substrate 1 is mounted with a CPU 11, a ROM 12, a RAM 13, and a nonvolatile memory 14, and is communicably connected with the reader/writer portion 3 via a data transmission path 4. The CPU 11, using the RAM 13 as a work area, executes programs that are preliminary stored in the ROM 12. Various types of data are recorded in the nonvolatile memory 14 by the CPU 11. The CPU 11 comprehensively controls image formation and the like in the image forming apparatus 100.

Figure 4:
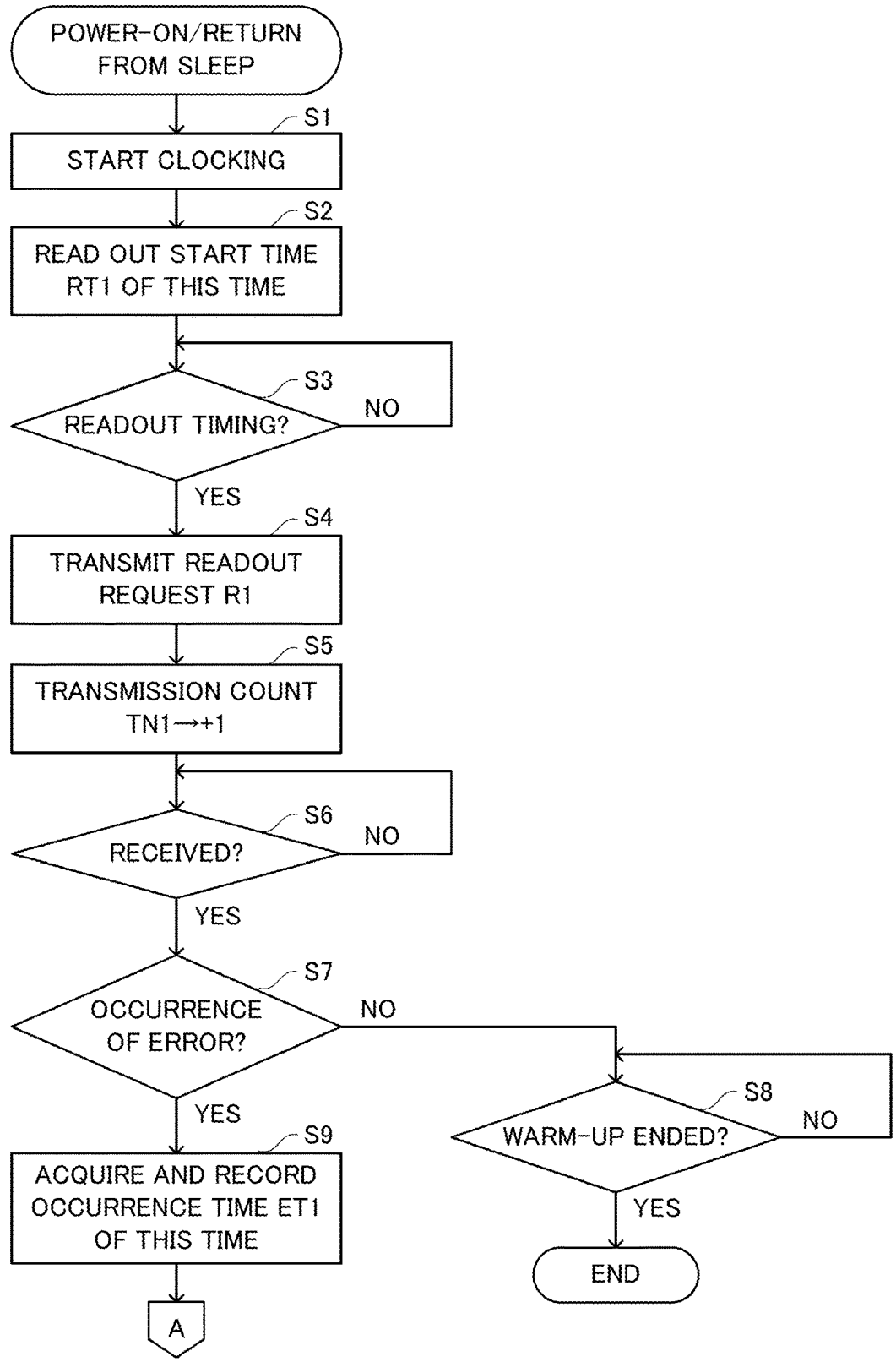
FIG. 4 is a flowchart showing a first half of a processing procedure of the readout controlling device shown in FIG. 2.
Figure 5:
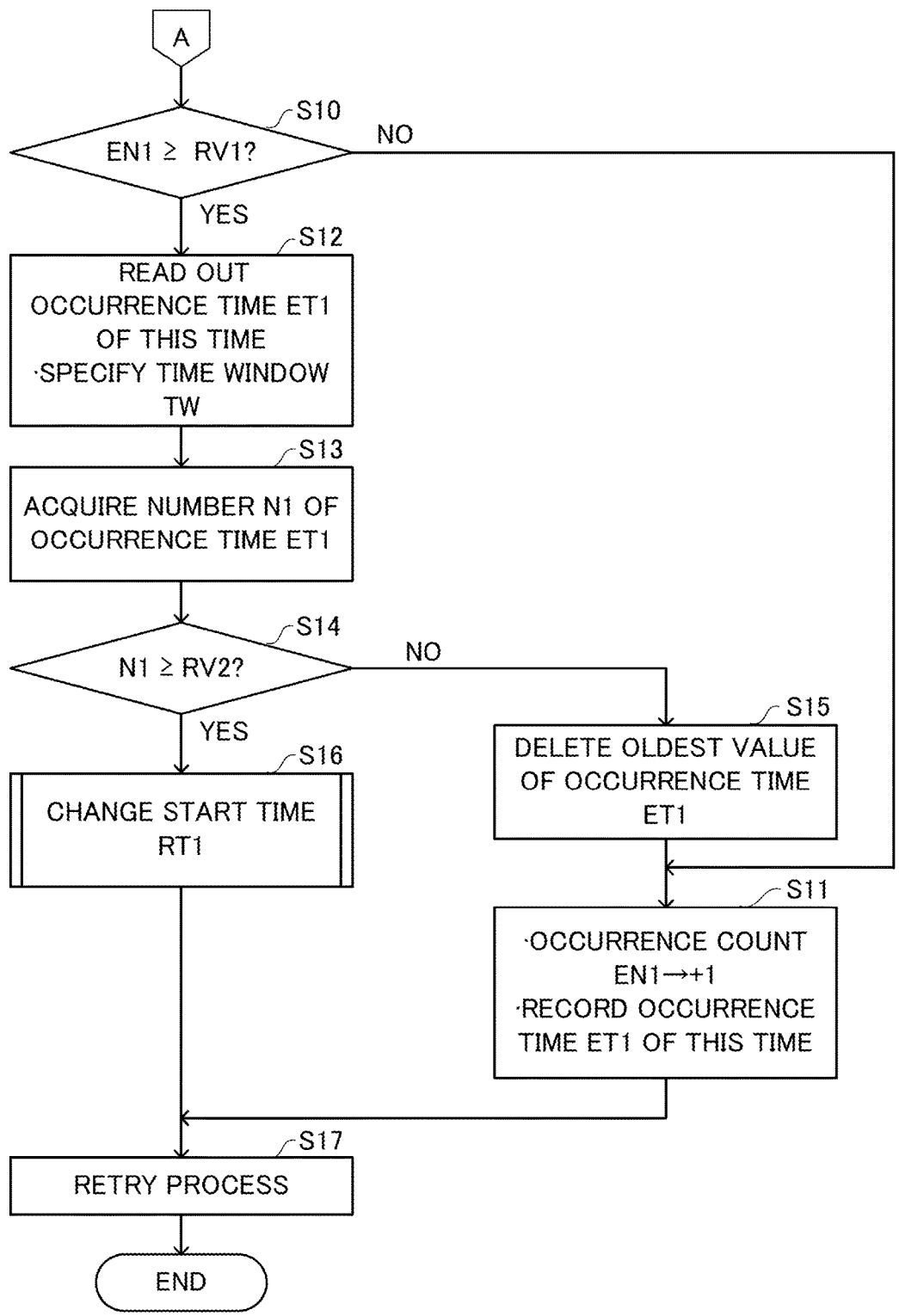
FIG. 5 is a flowchart showing a last half of the processing procedure of the readout controlling device shown in FIG. 2.

Together with the nonvolatile memory 14 and the like, the CPU 11 functions as a readout controlling device 200 in the present disclosure. In this case, the CPU 11 transmits a readout request R1 to the data transmission path 4 at a predetermined readout timing (see FIG. 4). The readout request R1 is a command for reading out a piece of information I1 from an RFID tag 27B provided on a toner container 27. In addition, the CPU 11 receives the piece of information I1 and an error detection code C1 (described in detail below) transmitted from the reader/writer portion 3 via the data transmission path 4. Based on the error detection code C1, the CPU 11 determines whether or not an error has occurred in the piece of information I1. If the CPU 11 determines that the error has not occurred, the CPU 11 determines based on the piece of information I1 whether or not toner stored in the toner container 27 described below is a genuine product. On the other hand, if the CPU 11 determines that the error has occurred, the CPU 11 performs a known retry process.

The CPU 11 also writes information in a storage medium 271 of the RFID tag 27B, but since the writing is not a main part of the present embodiment, it will not be described. The CPU 11 may be an electronic circuit such as an ASIC (Application Specific Integrated Circuit) or a DSP (Digital Signal Processor).

The image forming portion 2 includes a photoconductor drum 21, a charging device 22, an exposure device 23, a developing device 24, a transfer device 25, and a fixing device 26. The image forming portion 2 electrophotographically forms a toner image based on image data transmitted from the CPU 11. The image forming portion 2 transfers and fixes the image onto a sheet, and discharges the sheet outside of the image forming apparatus 100. Specifically, the photoconductor drum 21 is an example of an image carrier in the present disclosure. The photoconductor drum 21 is charged by the charging device 22. Furthermore, the photoconductor drum 21 is exposed to light by the exposure device 23. Specifically, by using the exposure device 23 to irradiate modulated light on the photoconductor drum 21 based on the image data, an electrostatic latent image based on the image data is formed on the photoconductor drum 21. The developing device 24 develops the electrostatic latent image using toner stored in the developing device 24. With this configuration, the toner image is formed on the photoconductor drum 21. The toner image is transferred to the sheet by the transfer device 25, and then fixed on the sheet by the fixing device 26.

The image forming portion 2 further includes the toner container 27 as an example of a consumable unit. The toner container 27 is removably attached to the image forming apparatus 100. The toner container 27 is stored with toner that is supplied to the developing device 24.

In addition, the RFID tag 27B is provided in or on a casing 27A of the toner container 27. Specifically, the RFID tag 27B is provided on a bottom surface of the casing 27A. The RFID tag 27B is an example of a storage device in the present disclosure. The RFID tag 27B transmits and receives information to and from a reader/writer portion 3 by short-range wireless communication using electromagnetic fields or radio waves. In addition, the RFID tag 27B is communicably connected with the readout controlling device 200 via the reader/writer portion 3 and the data transmission path 4.

Specifically, as shown in FIG. 2, the RFID tag 27B includes the storage medium 271, a communication controlling portion 272, and a transmission/reception antenna 273. Various types of information relating to the toner container 27 (see FIG. 1) is preliminarily stored in the storage medium 271. The information includes identification information indicating that the toner is a genuine product. The information may include remaining amount information that indicates an amount of toner in the toner container 27, or the like. The communication controlling portion 272 receives a request signal RS1 transmitted from the reader/writer portion 3 via the transmission/reception antenna 273. Next, the communication controlling portion 272 regenerates a readout request R1 or a re-readout request RR1 from the request signal RS1 according to a predetermined decoding method. Then, the communication controlling portion 272 reads out the piece of information I1 from the storage medium 271, and generates the error detection code C1 based on the piece of information I1. The error detection code C1 is a CRC (Cyclic Redundancy Check) value or the like, and is obtained by substituting the piece of information I1 in a predetermined generator polynomial. The communication controlling portion 272 adds the error detection code C1 to the piece of information I1. The communication controlling portion 272 generates a response signal AS1 from the piece of information I1 and the error detection code C1 according to a predetermined encoding method, and transmits the response signal AS1 from the transmission/reception antenna 273.

In the present embodiment, a description is given of a case where the RFID tag 27B and the reader/writer portion 3 perform the short-range wireless communication. However, the present disclosure is not limited to this case, and the control circuit substrate 1 may be connected to the storage medium 271 on the toner container 27 via a contact terminal and a transmission line in a way that data transmission is possible.

In addition, in the present embodiment, a description is given of a case where the RFID tag 27B is provided in or on the toner container 27 that is the consumable unit. Another example of the consumable unit may be the photoconductor drum 21, in which case the RFID tag 27B is provided in or on the photoconductor drum 21, and information relating to the photoconductor drum 21 is stored in the storage medium 271.

In FIG. 1, the reader/writer portion 3 is provided at a position close to and opposite of the RFID tag 27B if the toner container 27 is attached to the image forming apparatus 100. Specifically, as shown in FIG. 2, the reader/writer portion 3 includes an encoding portion 41, a transmission antenna 42, a decoding portion 43, and a reception antenna 44. The encoding portion 41 receives the readout request R1 or the re-readout request RR1 via the data transmission path 4. The encoding portion 41 generates the request signal RS1 from the readout request R1 or the re-readout request RR1 according to the encoding method, and transmits the request signal RS1 from the transmission antenna 42. In addition, the decoding portion 43 receives the response signal AS1 transmitted from the RFID tag 27B via the reception antenna 44. The decoding portion 43 regenerates the piece of information I1 and the error detection code C1 from the response signal AS1 according to the decoding method, and transmits the piece of information I1 and the error detection code C1 to the data transmission path 4.

The transmission antenna 42, the reception antenna 44 and the transmission/reception antenna 273 (described below) may be a planar antenna different from the planar coil antennas shown in the figure. In addition, one transmission/reception antenna may be mounted on the reader/writer portion 3, instead of the transmission antenna 42 and the reception antenna 44.

In a case where noise is superposed on the data transmission path 4, the error often occurs in the piece of information I1. The noise includes a type of noise that is repeatedly superposed on the data transmission path 4 after a certain period of time elapses from the readout timing. Hereinafter, this type of noise is referred to as repetitive noise. After the image forming apparatus 100 is powered on or after the image forming apparatus 100 returns from a sleep mode, a transient current flows along a switching power supply portion or an electronic circuit (not shown) or the like, provided in the image forming apparatus 100. This causes a tendency for the repetitive noise to be generated after the image forming apparatus 100 is powered on or returns from the sleep mode. If a timing (hereinafter referred to as a superposition timing) at which the repetitive noise is superposed on the data transmission path 4 coincides with another timing (hereinafter referred to as a transmission timing) at which the piece of information I1 is transmitted along the data transmission path 4, it is determined that the error has occurred every time the readout controlling device 200 reads out the piece of information I1, and there is a concern of an execution frequency of the retry process increasing. It is noted that hereinafter, the powering on of the image forming apparatus 100 and the image forming apparatus 100 returning from the sleep mode are collectively referred to as a power-on or the like.

The present embodiment provides a readout controlling device 200 and an image forming apparatus 100 capable of reducing the execution frequency of the retry process.

As shown in FIG. 2, the CPU 11 functions as the readout controlling device 200 by executing the programs. The readout controlling device 200 includes a transmission controlling portion 11A, an error determining portion 11B, a first change determining portion 11C, a second change determining portion 11D, a time changing portion 11E, and a retransmission controlling portion 11F. In addition, the nonvolatile memory 14 includes a recording area used as a start time recording portion 14A, an occurrence count recording portion 14B, an occurrence time recording portion 14C, and a transmission count recording portion 14D.

Below, processing by the readout controlling device 200 is described in detail with reference to FIG. 1 to FIG. 5.

As shown in FIG. 3, a start time RT1 is recorded in the start time recording portion 14A. The start time RT1 indicates a time when readout of the piece of information I1 from the RFID tag 27B is started. The start time RT1 is changed by the time changing portion 11E, described below. Specifically, the start time RT1 is a value within a value range from a lower limit value LL1 to an upper limit value UL1, and is shifted by a time interval ΔT1 to be changed to an adjusted value. The changed start time RT1 is used after a next power-on or the like. An initial value IV of the start time RT1 used when the image forming apparatus 100 is powered on for a first time, is preliminarily recorded in the start time recording portion 14A. The initial value IV is a median value between the lower limit value LL1 and the upper limit value UL1.

After the power-on or the like, the CPU 11 starts warm-up of the image forming apparatus 100. In addition, the CPU 11 starts a process shown by flowcharts in FIG. 4 and FIG. 5. Immediately after the process starts, the transmission controlling portion 11A starts clocking (step S1 in FIG. 4) using a timer (not shown). Next, the transmission controlling portion 11A reads out the start time RT1 from the start time recording portion 14A (step S2). Hereinafter, the value of the start time RT1 read out in step S2 is referred to as the start time RT1 of this time.

Next, the transmission controlling portion 11A determines whether or not the readout timing has come (step S3). That is, the transmission controlling portion 11A determines whether or not the start time RT1 of this time has passed after the clocking start time of the timer. The clocking start time is the same as a time of the power-on or the like.

If the transmission controlling portion 11A determines that the start time RT1 of this time has not passed, the transmission controlling portion 11A returns the process to step S3. On the other hand, if the transmission controlling portion 11A determines that the start time RT1 of this time has passed, the readout request R1 to the RFID tag 27B is transmitted from the transmission controlling portion 11A to the data transmission path 4 (step S4). As described above, in steps S1 to S4, the transmission controlling portion 11A transmits the readout request R1 for the piece of information I1 toward the RFID tag 27B, based on the start time RT1 recorded in the start time recording portion 14A.

In FIG. 3, transmission counts of the readout request R1 are recorded in the transmission count recording portion 14D as values of a transmission count TN1, in correspondence with values of the start time RT1 that can be recorded in the start time recording portion 14A. After execution of step S4, the transmission controlling portion 11A increments the transmission count TN1 corresponding to the start time RT1 of this time by one. The value of the transmission count TN1 for each value of the start time RT1 is used in step S168, described below.

The readout request R1 transmitted in step S4 is received by the reader/writer portion 3 (see FIG. 2). The reader/writer portion 3 transmits the request signal RS1 based on the readout request R1 to the RFID tag 27B. In the RFID tag 27B, after the piece of information I1 is read out in response to the request signal RS1, the error detection code C1 based on the piece of information I1 is acquired. Next, the RFID tag 27B generates the response signal AS1, and transmits the response signal AS1 to the reader/writer portion 3. The reader/writer portion 3 regenerates the piece of information I1 and the error detection code C1 from the response signal AS1, and transmits the piece of information I1 and the error detection code C1 to the readout controlling device 200 via the data transmission path 4.

After step S5, the error determining portion 11B determines whether or not the piece of information I1 and the error detection code C1 have been received (step S6). If the error determining portion 11B determines that the piece of information I1 and the error detection code C1 have not been received, the error determining portion 11B returns the process to step S6. On the other hand, if the error determining portion 11B determines that the piece of information I1 and the error detection code C1 have been received, the error determining portion 11B moves the process to step S7.

The error determining portion 11B determines whether or not the error has occurred in the piece of information I1 based on the error detection code C1 (step S7). If the error determining portion 11B determines that the error has not occurred, the error determining portion 11B moves the process to step S8. On the other hand, if the error determining portion 11B determines that the error has occurred, the error determining portion 11B moves the process to step S9.

In step S8, the CPU 11 determines whether or not the warm-up has ended. If the CPU 11 determines that the warm-up has not ended, the CPU 11 returns the process to step S8. On the other hand, if the CPU 11 determines that the warm-up has ended, the CPU 11 ends the process shown in FIG. 4, and waits until it receives the image data.

In step S9, the error determining portion 11B acquires a value on the timer as a value of an occurrence time ET1, and records the value of the occurrence time ET1 in the RAM 13.

Then, the error determining portion 11B resets the value on the timer. The occurrence time ET1 indicates a length of time from the clocking start time to a time when it is determined that the error has occurred. It is noted that hereinafter, the value of the occurrence time ET1 acquired in step S9 after the power-on or the like for this time is referred to as the occurrence time ET1 of this time.

In FIG. 3, counts of how many times the error is determined to have occurred are recorded in the occurrence count recording portion 14B as values of an occurrence count EN1, in correspondence with the values of the start time RT1 that can be recorded in the start time recording portion 14A. Values of the occurrence count EN1 recorded in the occurrence count recording portion 14B in correspondence with the start time RT1 of this time includes an older value of the occurrence count EN1 that indicates the count of how many times the errors were determined to have occurred in the past, from when the image forming apparatus 100 was powered on for the first time.

Next, the first change determining portion 11C reads out a value of the occurrence count EN1 corresponding to the start time RT1 of this time from the occurrence count recording portion 14B. Then, the first change determining portion 11C determines whether or not the readout value of the occurrence count EN1 is greater than or equal to a predetermined count reference value RV1 (step S10 in FIG. 5). The count reference value RV1 is a threshold used with the start time RT1 of this time to indicate whether or not the error is occurring frequently in the readout piece of information I1, and is appropriately specified in a designing stage of the readout controlling device 200. The count reference value RV1 in the present embodiment is 5.

If the first change determining portion 11C determines that the value of the occurrence count EN1 is less than the count reference value RV1, the first change determining portion 11C moves the process to step S11. On the other hand, if the first change determining portion 11C determines that the value of the occurrence count EN1 is greater than or equal to the count reference value RV1, the first change determining portion 11C moves the process to step S12.

In FIG. 3, times of when the error is determined to have occurred are recorded in the occurrence time recording portion 14C as values of the occurrence time ET1, in correspondence with the values of the start time RT1 recorded in the start time recording portion 14A. Specifically, the number of the values of the occurrence time ET1, each indicating the time of the error that occurred in the piece of information I1 readout at the start time RT1, that can be recorded in the occurrence time recording portion 14C is equivalent to the count reference value RV1. More specifically, among all of the values indicating the occurrence time ET1 of the errors that occurred in the past, the number of the values equivalent to the count reference value RV1 can be recorded in the occurrence time recording portion 14C, counting from the occurrence time ET1 of this time toward older values of the occurrence time ET1.

In step S11, the first change determining portion 11C increments the occurrence count EN1 by one in the occurrence count recording portion 14B, and records the occurrence time ET1 of this time in the occurrence time recording portion 14C. Then, the first change determining portion 11C moves the process to step S17, described below.

In step S12, the second change determining portion 11D reads out the occurrence time ET1 of this time from the RAM 13. Next, the second change determining portion 11D specifies a time window TW based on the occurrence time ET1 of this time (step S12). A lower limit value and an upper limit value of the time window TW are a value obtained by subtracting the predetermined time interval ΔT1 from the occurrence time ET1 of this time, and a value obtained by adding the time interval ΔT1 to the occurrence time ET1 of this time, respectively. The time interval ΔT1 is appropriately specified during the designing stage of the readout controlling device 200. The time interval ΔT1 is specified as 5 ms in the present embodiment. The time window TW is an example of a time range in the present disclosure. Next, the second change determining portion 11D acquires a number N1 indicating the number of values of the occurrence time ET1 included in a value range of the time window TW, among the values of the occurrence time ET1 recorded in the occurrence time recording portion 14C (step S13).

Next, the second change determining portion 11D determines whether or not the number N1 is greater than or equal to a predetermined number reference value RV2 (step S14). The number reference value RV2 is a threshold for indicating whether or not the error is occurring frequently during the time window TW when the readout request R1 is transmitted at the start time RT1 of this time, and is appropriately specified during the designing stage of the readout controlling device 200. In the present embodiment, the number reference value RV2 is specified as 3.

If the second change determining portion 11D determines that the number N1 is less than the number reference value RV2, the second change determining portion 11D assumes that the error is not repetitively occurring in the data transmission path 4, and moves the process to step S15. On the other hand, if the second change determining portion 11D determines that the number N1 is greater than or equal to the number reference value RV2, the second change determining portion 11D assumes that the repetitive error is occurring in the data transmission path 4, and moves the process to step S16.

In step S15, the second change determining portion 11D deletes an oldest value of the occurrence time ET1, and frees a recording area in the occurrence time recording portion 14C. Then, the second change determining portion 11D executes step S11.

In step S16, the time changing portion 11E changes the start time RT1 recorded in the start time recording portion 14A. Specifically, the time changing portion 11E derives the adjusted value by shifting the start time RT1 of this time by the time interval ΔT1 within the value range from the lower limit value LL1 to the upper limit value UL1. In a case where the adjusted value satisfies a condition described below, the time changing portion 11E records the adjusted value in the start time recording portion 14A as the start time RT1 to be used after the next power-on or the like. When step S16 ends, the time changing portion 11E moves the process to step S17.

The larger the upper limit value UL1 is and the smaller the lower limit value LL1, the larger the number of times the start time RT1 can be changed is. However, if the upper limit value UL1 is too large, transmission of the readout request R1 from the readout controlling device 200 becomes slow, and reception of the piece of information I1 is delayed. The upper limit value UL1 is appropriately specified during the designing stage of the readout controlling device 200 with consideration of this issue. In addition, the readout controlling device 200 transmits the readout request R1 after the start time RT1 has passed from the power-on or the like. Accordingly, the lower limit value LL1 is specified as a time later than or equal to a predetermined time after the power-on or the like. Processing in step S16 is described in detail below.

By executing step S16, after the next power-on or the like, the readout request R1 is transmitted based on a start time RT1 that is different from the start time RT1 of this time. As a result, it is possible to lower the chance of the superposition timing of the repetitive noise coinciding with the transmission timing of the piece of information I1, thus reducing the execution frequency of the retry process of the step S17. In addition, it is possible to avoid the repetitive noise that tends to be generated immediately after the power-on or the like of the image forming apparatus 100, during readout of the information.

Particularly, in the present embodiment, the time window TW is specified by adding and subtracting the time interval ΔT1 from the start time RT1 of this time (step S12). In a case where many of the values of the occurrence time ET1 recorded in the occurrence time recording portion 14C are included in the time window TW, the time changing portion 11E specifies a value obtained by shifting the start time RT1 of this time by the time interval ΔT1, as a changed start time RT1. This allows for the chance of the superposition timing of the repetitive noise coinciding with the transmission timing of the piece of information I1 to be lowered further.

In step S17, the retransmission controlling portion 11F performs the retry process, and transmits the re-readout request RR1 toward the RFID tag 27B through the data transmission path 4. The re-readout request RR1 is processed in the same way as the readout request R1 in the reader/writer portion 3. The RFID tag 27B transmits the same response signal AS1 as described above to the reader/writer portion 3. The reader/writer portion 3 transmits the piece of information I1 and the error detection code C1 to the readout controlling device 200 in the same way as described above.

Next, a changing process of the start time RT1 in step S16 is described in detail with reference to FIG. 6 and FIG. 7.

Figure 7:
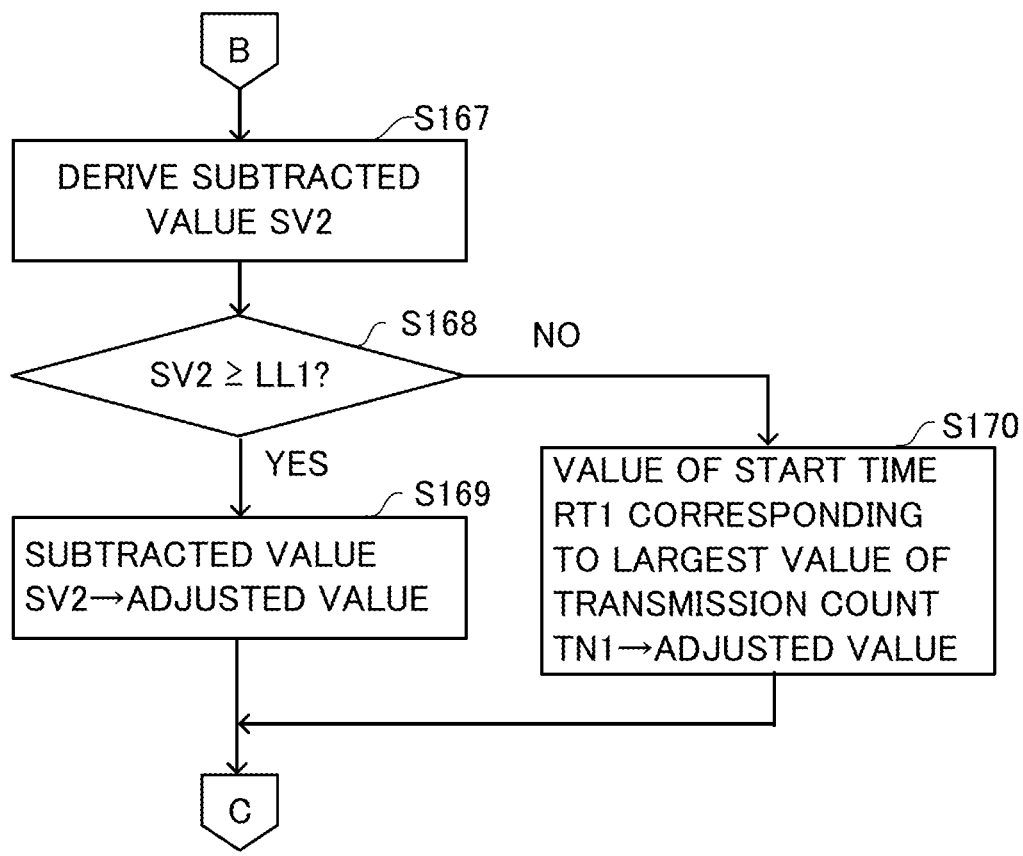
FIG. 7 is a flowchart showing a second part of the detailed processing procedure of step S16 shown in FIG. 5.

In step S161 of FIG. 7, the time changing portion 11E increments the occurrence count EN1 for the start time RT1 of this time by one. Furthermore, the time changing portion 11E deletes all values of the occurrence time ET1 in the occurrence time recording portion 14C, and frees a recording area in the occurrence time recording portion 14C (step S161).

The time changing portion 11E determines whether or not the start time RT1 of this time is larger than the initial value IV (step S162). If the time changing portion 11E determines that the start time RT1 of this time is larger than the initial value IV, the time changing portion 11E moves the process to step S163. On the other hand, if the time changing portion 11E determines that the start time RT1 of this time is not larger than the initial value IV, the time changing portion 11E moves the process to step S167.

In step S163, the time changing portion 11E derives an added value AV1 by adding the time interval ΔT1 to the start time RT1 of this time. Then, the time changing portion 11E determines whether or not the added value AV1 is less than or equal to the upper limit value UL1 (step S164). If the time changing portion 11E determines that the added value AV1 is less than or equal to the upper limit value UL1, the time changing portion 11E specifies the added value AV1 as the adjusted value (step S165). On the other hand, if the time changing portion 11E determines that the added value AV1 is greater than the upper limit value UL1, the time changing portion 11E specifies, as the adjusted value, a specific value SV1 that is obtained by subtracting the time interval ΔT1 from the initial value IV (step S166).

In step S167 of FIG. 7, the time changing portion 11E derives a subtracted value SV2 by subtracting the time interval ΔT1 from the start time RT1 of this time. Then, the time changing portion 11E determines whether or not the subtracted value SV2 is less than the lower limit value LL1. If the time changing portion 11E determines that the subtracted value SV2 is greater than or equal to the lower limit value LL1, the time changing portion 11E specifies the subtracted value SV2 as the adjusted value (step S169). On the other hand, if the time changing portion 11E determines that the subtracted value SV2 is less than the lower limit value LL1, the time changing portion 11E specifies a value of the start time RT1, among the values of the start time RT1 recorded in the transmission count recording portion 14D, that has the largest transmission count TN1 as the adjusted value (step S170).

Figure 6:
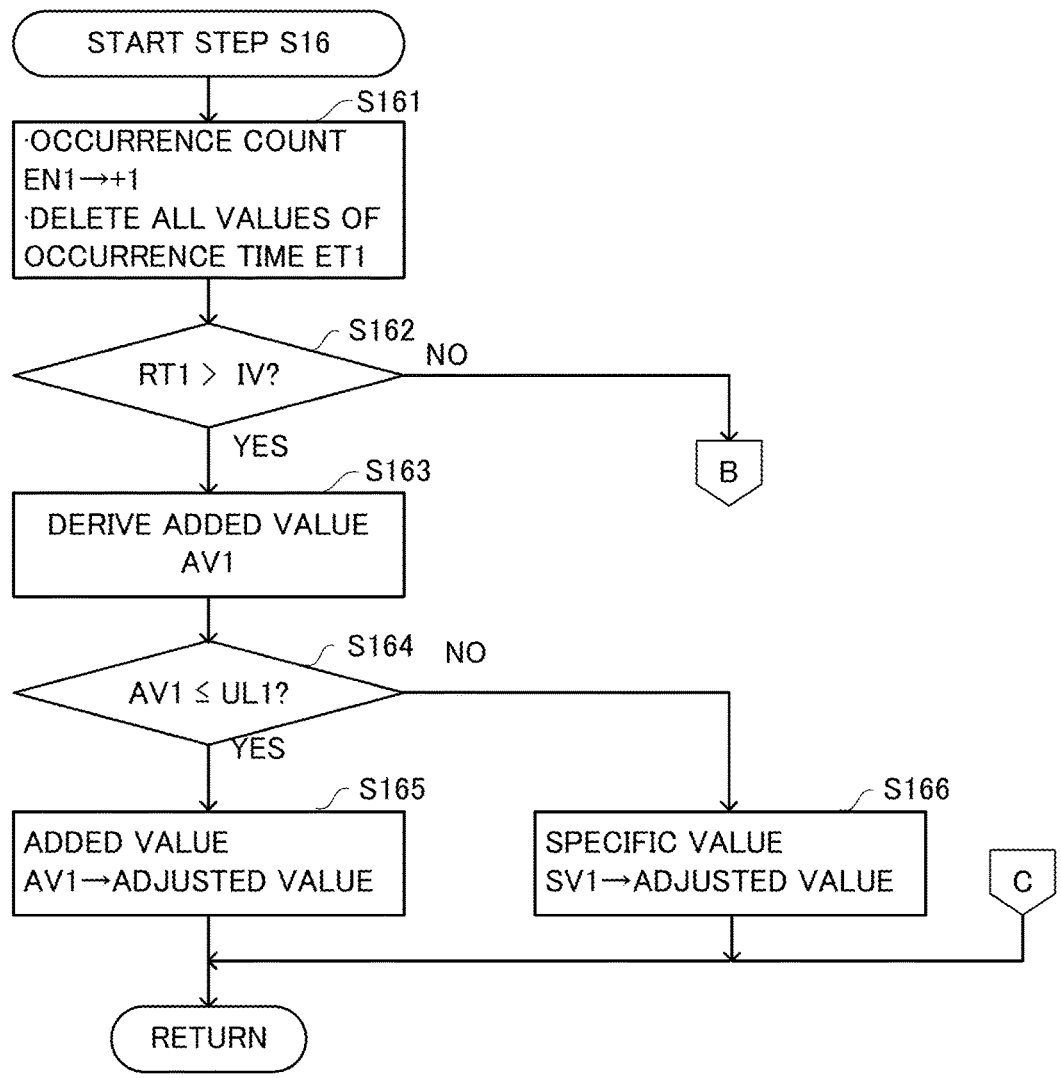
FIG. 6 is a flowchart showing a first part of a detailed processing procedure of step S16 shown in FIG. 5.

According to the processes in FIG. 6 and FIG. 7, the start time RT1 in start time recording portion 14A is changed to the adjusted value between the initial value IV and the upper limit value UL1, and then is changed to the adjusted value between the lower limit value LL1 and the initial value IV. The repetitive noise tends to be generated by the transient current that flows along the switching power supply portion or the like provided in the image forming apparatus 100. Thus, by changing the start time RT1 to the adjusted value toward the upper limit value UL1, the chance of the superposition timing of the repetitive noise coinciding with the transmission timing of the piece of information I1 can be lowered further.

In addition, according to the processes in FIG. 6 and FIG. 7, if the subtracted value SV2 is determined to be less than the lower limit value LL1, the value of the start time RT1 with the largest transmission count TN1 is specified as the adjusted value. With this configuration, the chance of the superposition timing of the repetitive noise coinciding with the transmission timing of the piece of information I1 can be lowered.

Deriving of the adjusted value of the start time RT1 is not limited to the processes in FIG. 6 and FIG. 7, and may be performed by a different procedure. The different procedure may be to monotonously increase the adjusted value of the start time RT1 from the lower limit value LL1 to the upper limit value UL1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A readout controlling device, comprising:
   a start time recording portion into which a start time of when a piece of information is read out from a storage device connected to the readout controlling device is recorded;
   a transmission controlling portion configured to transmit a readout request to read out the piece of information, toward the storage device based on the start time;
   an error determining portion configured to receive the piece of information readout from the storage device, and determine whether or not an error has occurred in the piece of information; and
   a time changing portion configured to change the start time recorded in the start time recording portion, if the error has been determined to have occurred.

2. The readout controlling device according to claim 1, further comprising an occurrence count recording portion in which a count of how many times the error is determined to have occurred is recorded as a value indicating an occurrence count, in correspondence with the start time recorded in the start time recording portion, and a first change determining portion configured to determine whether or not the occurrence count is greater than or equal to a predetermined count reference value, wherein the time changing portion changes the start time if the occurrence count is determined to be greater than or equal to the count reference value.

3. The readout controlling device according to claim 1, further comprising an occurrence time recording portion in which a time if the error is determined to have occurred is recorded as a value indicating an occurrence time, in correspondence with the start time recorded in the start time recording portion, and a second change determining portion configured to acquire a number of occurrence times included in a predetermined time range in the occurrence time recording portion, and determine whether or not the acquired number of occurrence times is greater than or equal to a predetermined number reference value, wherein the time changing portion changes the start time if the number of occurrence times is determined to be greater than or equal to the number reference value.

4. The readout controlling device according to claim 3, wherein if the error determining portion determines that the error has occurred, the error determining portion acquires the occurrence time, and the second change determining portion sets the time range based on the occurrence time acquired by the error determining portion.

5. The readout controlling device according to claim 1, wherein the time changing portion records an adjusted value derived by shifting the start time recorded in the start time recording portion by a predetermined time interval, in the start time recording portion.

6. The readout controlling device according to claim 5, wherein an initial value, an upper limit value, and a lower limit value are predetermined for the start time, and the time changing portion derives an added value by adding the time interval to the start time recorded in the start time recording portion, wherein if the added value is greater than or equal to the initial value and less than or equal to the upper limit value, the time changing portion records the added value as the adjusted value in the start time recording portion, and if the added value is not less than or equal to the upper limit value, the time changing portion records a predetermined specific value that is less than the initial value as the adjusted value in the start time recording portion, then the time changing portion derives a subtracted value by subtracting the time interval from the start time recorded in the start time recording portion, wherein if the subtracted value is less than the initial value and greater than or equal to the lower limit value, the time changing portion records the subtracted value as the adjusted value in the start time recording portion.

7. The readout controlling device according to claim 6, further comprising a transmission count recording portion in which a transmission count that is a number of times that the readout request is transmitted, is recorded for each of the start times recorded in the start time recording portion, wherein if the subtracted value is not greater than or equal to the lower limit value, the time changing portion records, in the start time recording portion, a value of the start time that corresponds to a largest value of the transmission count, among the values of the start time recorded in the transmission count recording portion.

8. An image forming apparatus, comprising:

an image forming portion including a developing device configured to develop an electrostatic latent image on an image carrier using toner;

a toner container in which toner supplied to the developing device is stored, a storage device being provided in or on the toner container; and a control device including the readout controlling device according to claim 1, wherein the piece of information is a piece of information relating to the toner container.

* * * * *